US008305067B2

(12) United States Patent
Cheung et al.

(10) Patent No.: US 8,305,067 B2
(45) Date of Patent: Nov. 6, 2012

(54) CONTROLLER AND DRIVER COMMUNICATION FOR SWITCHING REGULATORS

(75) Inventors: Chun Cheung, Brooklyn, NY (US); Weihong Qui, San Jose, CA (US); Robert Isham, Flemington, NJ (US)

(73) Assignee: Intersil Americas Inc., Milpitas, CA (US)

(*) Notice: Subject to any disclaimer, the term of this patent is extended or adjusted under 35 U.S.C. 154(b) by 134 days.

(21) Appl. No.: 13/025,471

(22) Filed: Feb. 11, 2011

(65) Prior Publication Data
US 2011/0133717 A1 Jun. 9, 2011

Related U.S. Application Data

(62) Division of application No. 12/840,466, filed on Jul. 21, 2010, now Pat. No. 7,911,194, which is a division of application No. 11/935,535, filed on Nov. 6, 2007, now Pat. No. 7,782,035.

(60) Provisional application No. 60/908,539, filed on Mar. 28, 2007.

(51) Int. Cl.
*G05F 1/40* (2006.01)

(52) U.S. Cl. ........................................ 323/285; 323/282

(58) Field of Classification Search .......... 323/222–225, 323/268, 271, 282, 284, 285, 349–351
See application file for complete search history.

(56) References Cited

U.S. PATENT DOCUMENTS

| | | | |
|---|---|---|---|
| 6,472,857 B1 | 10/2002 | Genest | |
| 6,969,979 B2 | 11/2005 | Kohout et al. | |
| 6,979,983 B2 | 12/2005 | Yen et al. | |
| 7,221,129 B2* | 5/2007 | Matsuo et al. | 323/222 |
| 7,446,520 B2 | 11/2008 | Hung | |
| 7,560,917 B2 | 7/2009 | Ho | |
| 7,576,530 B2 | 8/2009 | Nishida | |
| 7,595,624 B2 | 9/2009 | Tateishi et al. | |
| 7,629,778 B2* | 12/2009 | Liu | 323/222 |
| 7,679,218 B1 | 3/2010 | Isham | |
| 2009/0146635 A1 | 6/2009 | Qiu et al. | |
| 2010/0201336 A1 | 8/2010 | Chen | |

* cited by examiner

*Primary Examiner* — Matthew Nguyen
(74) *Attorney, Agent, or Firm* — Fogg & Powers LLC

(57) ABSTRACT

Pulse width modulation (PWM) controllers and output stage driver circuits and related methods of communicating switching regulator mode information. The controller includes circuitry that recognizes intervals when the load driven by the regulator is in a low power mode. Responsive to recognizing the low power mode, the controller generates a PWM mode signal having at least three (3) different levels including at least one intermediate level that is coupled to at least one driver. Based on the PWM mode signal, the regulator is switched into a power saving low power operational mode.

3 Claims, 13 Drawing Sheets

CONTROLLER AND DRIVER COMMUNICATION FOR SWITCHING REGULATORS

CROSS-REFERENCE TO RELATED APPLICATIONS

This application is a divisional of U.S. application Ser. No. 12/840,466 filed on Jul. 21, 2010, which is a divisional of U.S. application Ser. No. 11/935,535, filed on Nov. 6, 2007, now U.S. Pat. No. 7,782,035, which claims priority to U.S. Provisional Application No. 60/908,539, filed on Mar. 28, 2007, all of which are incorporated herein by reference in their entirety.

BACKGROUND OF THE INVENTION

It is known to improve synchronous switching voltage regulator efficiency at light load conditions to have the regulator operate under diode emulation mode (DEM). With DEM enabled, the bottom-side MOSFET switch is disabled preventing negative current flow from the output inductor during low load operation. Under heavy loads, the voltage regulator operates under forced continuous conduction mode (FCCM). In FCCM, the controller always operates as a synchronous rectifier, switching the bottom-side MOSFET regardless of the output load. Thus, in FCCM, the inductor current flows in both directions.

FIG. 1 is a block diagram schematic showing a conventional pulse width modulation (PWM) controller and driver arrangement 100 showing conventional signaling to implement the diode emulation communication between a controller 110 and drivers 120 and 130, for a two-phase regulator system. The arrangement 100 uses dedicated FCCM pins. Driver 120 drives one phase and driver 130 drives the other phase. Specifically, controller 110 has an FCCM pin where an FCCM signal is provided and drivers 120 and 130 each have an FCCM pin for receiving the FCCM signal. Drivers 120 and 130 are each associated with respective phases. In a common embodiment, drivers 120 and 130 drive synchronous output switches coupled to an inductor which is connected to a load, such as a microprocessor. When the load is a microprocessor, the microprocessor generally provides a mode indicating signal generally referred to as a mode select signal which can be used as an external triggering signal to trigger the regulator to enter DEM.

The mode select signal is generally in one of two states indicative of the level of the load current drawn. For example, when the microprocessor senses the load current being heavy, the mode select can be in the "1" state. When the microprocessor senses the load current being light, such as below a predetermined current threshold set on the microprocessor, the mode select output can be in the "0" state. For INTEL® microprocessors, the mode select signal is referred to as a Processor Power Status Indicator (PSI# signal).

While the mode select signal asserted is low, the FCCM pin of controller 110 will send a low FCCM signal to initiate the drivers 120 and 130 into DEM to save power and improve light load efficiency. However, during significant output over voltage events, even if PSI# is asserted low, the controller 110 sends a high FCCM signal to turn on the low-side FET switch and sink current to protect the processor or other load from over voltage stress. This requires routing the FCCM signal to all drivers in multiphase arrangements. In the case the controller and gate drivers are on separate chips, as the number of phases increases, the PCB layout becomes complex and traces becomes crowded in a typical spacing limited motherboard. Moreover, some new controllers and gate drivers have low pin counts (e.g., 8 pins). As a result, there may be no controller or gate driver pin available for accommodation of an FCCM signal.

FIG. 2 is a simulated conventional diode emulation communication timing diagram 200 for one of the two phases controlled by signaling arrangement 100 shown in FIG. 1. The UGATE and LGATE signals are provided by gate drivers 120 and 130, which as known in the art, are coupled to upper and lower gates of synchronous output switches, respectively. The UGATE and LGATE signals are responsive to the FCCM and PWM signals provided by controller 110. Note the presence of a dedicated FCCM signal and the conventional two (2) state PWM signal used.

At time to, FCCM becomes low. In response, DEM mode is soon enabled, preventing negative current flow from the output inductor ($I_L$) as shown between times $t_1$ and $t_2$ and times $t_3$ and $t_4$ in FIG. 2. A dedicated FCCM pin and the required signaling to implement DEM increases the pin count for both the controller and the driver as well as the layout complexity. What is needed is a simplified DEM communication method that eliminates the need for the presently required extra FCCM pin for the controller and the FCCM pin for the driver(s).

BRIEF DESCRIPTION OF THE DRAWINGS

A fuller understanding of the present invention and the features and benefits thereof will be accomplished upon review of the following detailed description together with the accompanying drawings, in which.

SUMMARY

Figure 1:
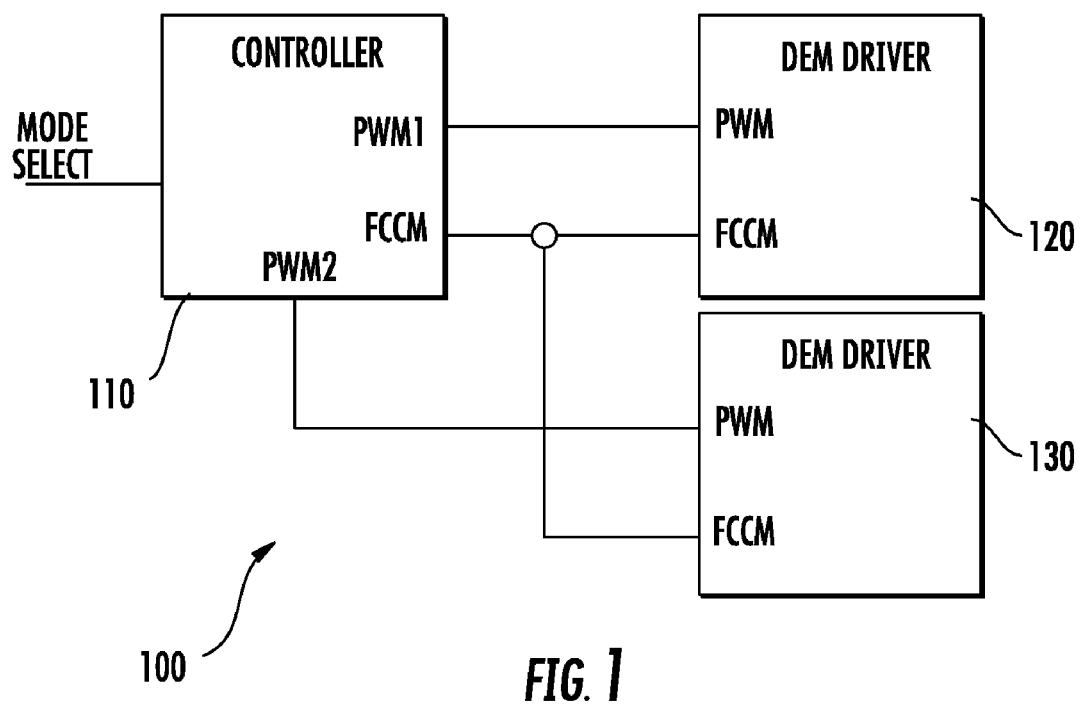
FIG. 1 is a block diagram schematic showing a conventional signaling arrangement to implement diode emulation communication.

According to one embodiment of the invention, a method of communicating mode information for operation of a switching regulator between a PWM controller and at least one output stage driver is provided. The driver is coupled to at least one output switch which drives a load. A mode indicating signal is received at the controller, wherein the mode indicating signal is operable to indicate intervals of time when the load is in a low power mode. Based on the mode indicating signal, it is determined when the load is in the low power mode. Responsive to the determining, the controller generates a PWM signal encoded with mode information referred to herein as a PWM mode signal. The PWM mode signal comprises at least three (3) different levels including at least one intermediate level. The PWM mode signal is coupled to the input of the driver. Based on the PWM mode signal, the regulator is switched into at least one low power operational mode. The low power operational mode can comprise diode emulation mode (DEM), phase dropping mode and a diode braking mode.

A transition of the PWM mode signal between a high or low level and the intermediate level can be used for triggering said switching. For example, diode braking can be initiated when the PWM mode signal transitions from the high level to the intermediate level.

The PWM mode signal can comprise a repetitive pattern which begins at a transition from a high level to a low level, reaches the intermediate level after a first time, and transitions from the intermediate level to the high level at a second time, the second time after the first time.

A modulation controller according to an embodiment of the invention comprises an error amplifier which receives a reference voltage and an output voltage signal from a switching regulator being controlled by the controller at its inputs. The controller includes at least one comparator, a first input of the comparator coupled to an output of the error amplifier and a second input coupled to receive a ramp signal. A pulse timing circuit having a first input is coupled to an output of the comparator, and a second input is coupled to receive a mode indicating signal, wherein an output of the pulse timing circuit operable to provide a PWM mode signal having at least three (3) different levels including at least one intermediate level. The controller can comprise a multi-phase controller.

A driver according to an embodiment of the invention for driving output switches coupled to a load in a switching regulator-based system comprises an input stage comprising a pair of comparators operable to receive a PWM mode signal having at least three (3) different levels including at least one intermediate level and at least one detection circuit operable to detect the PWM mode signal. An output stage is coupled to receive outputs from the input stage and the detection circuit. The output stage is operable for recognizing when the PWM mode signal is at or transitioning to or from the intermediate level to another level and responsive thereto providing a plurality of output signals to the output switches operable to switch the regulator into at least one low power operational mode.

According to another embodiment of the invention, a modulation controller and gate driver combination is described. In yet other embodiments of the invention, systems including microprocessor-based systems are also described.

DETAILED DESCRIPTION

Embodiments of the present invention are more particularly described in the following description and examples that are intended to be illustrative only since numerous modifications and variations therein will be apparent to those of ordinary skill in the art. As used in the specification and in the claims, the singular form "a," "an," and "the" may include plural referents unless the context clearly dictates otherwise. Also, as used in the specification and in the claims, the term "comprising" may include the embodiments "consisting of" and "consisting essentially of".

In various embodiments of the present invention, an improved method and related controller and gate driver architecture for communicating mode information between a PWM controller and one or more gate drivers is provided. Methods according to embodiments of the invention comprise providing a PWM controller having at least one PWM output coupled to an input of at least one gate driver. The controller is operable for generating a PWM mode signal having at least three (3) levels including at least one intermediate level responsive to the receipt of a mode indicating signal which indicates whether the load is in a low power mode (e.g., PSI# signal), or low current regulator operation. The invention is applicable to both single phase and multi-phase regulator systems, and both coupled inductor and non-coupled inductor arrangements.

Figure 3:
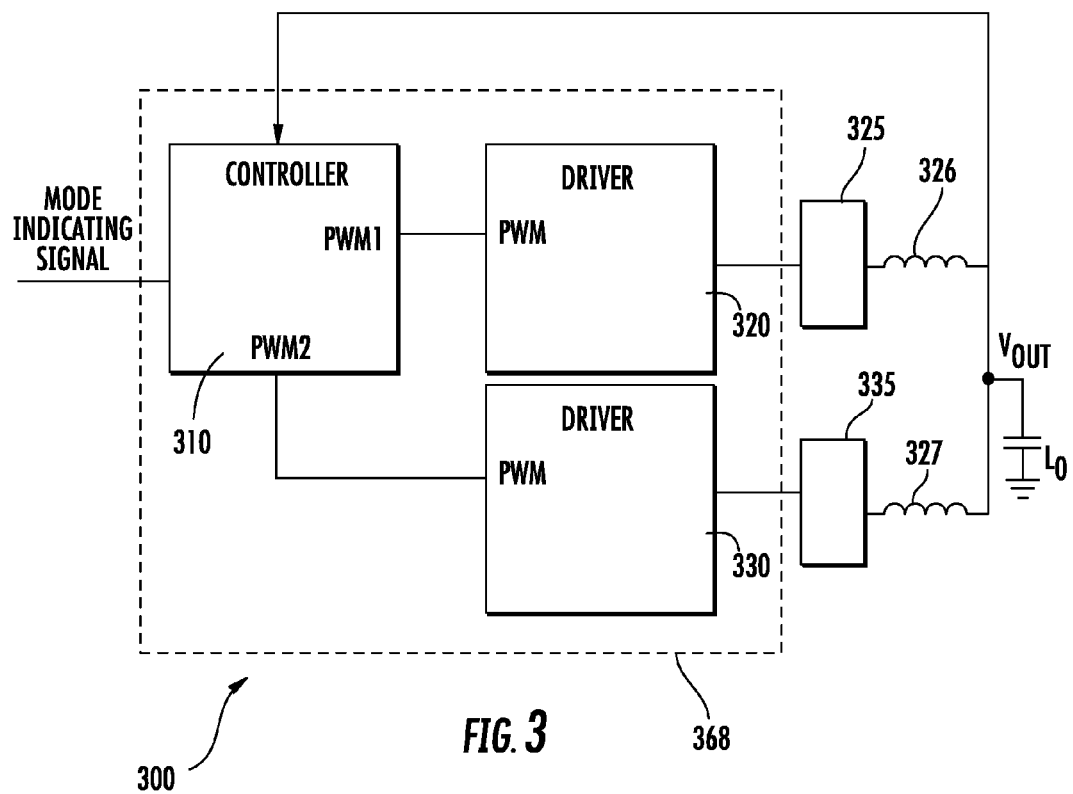
FIG. 3 is a simplified block diagram showing a regulator including a controller/gate driver signaling arrangement according to an embodiment of the invention.

FIG. 3 is a simplified block diagram showing a two-phase regulator 300 including a controller/gate driver signaling arrangement according to an embodiment of the invention. Regulator 300 comprises a modulation controller 310 coupled to two (2) drivers 310 and 320, shown collectively as controller/driver combination 368. As described below, the controller/driver 368 uses a new PWM mode signal which allows the regulator to enter a low power (power saving) operational mode, such as DEM and/or phase dropping for multiphase systems, without the need for a dedicated FCCM signal. Although the invention is described with respect to NMOS output switches, specifically double diffused NMOS switches (n-DMOS), those having ordinary skill in the art will recognize standard single diffused and/or PMOS output switches may also be used. Controller/gate driver 368 can be on the same integrated circuit chip 368. However, in another embodiment of the invention, the controller 310 and one or more gate drivers 320 and 330 can be on separate chips.

The drivers 320 and 330 receive the PWM mode signals, PWM1 and PWM2, generated by controller 310 at one of their inputs. In response to the drivers 320 and 330 detecting the PWM mode signal being at an intermediate level, such as in one embodiment for at least a predetermined period of time, the gate drivers 320 and 330 provide output signals operable to drive the gates of respective output switches 325 and 335, respectively, that are shown coupled to inductor 326 and 327, so that regulator 300 enters a low power operational mode. The low power operational mode can comprise at least one of a diode emulation mode (DEM), phase dropping mode, or diode braking mode.

As used herein, phase dropping refers to removing (shutting down) one or more coupled phases in a multiphase regulator system. Diode braking as used herein refers to turning off both synchronous output switches (UGATE and LGATE), such as after the PWM mode signal transitions from a high level to the intermediate level.

Phase-dropping allows the device to be configured to alternate the number of active phases (e.g., 2-phase to 1-phase operation, or 3-phase to 2-phase operation). Combining the dynamic phase add-drop feature together with diode emulation mode at light load can further maximize the regulator efficiency over a wide load range, which in the case of battery power supplies, can significantly improve battery life.

Figure 4A:
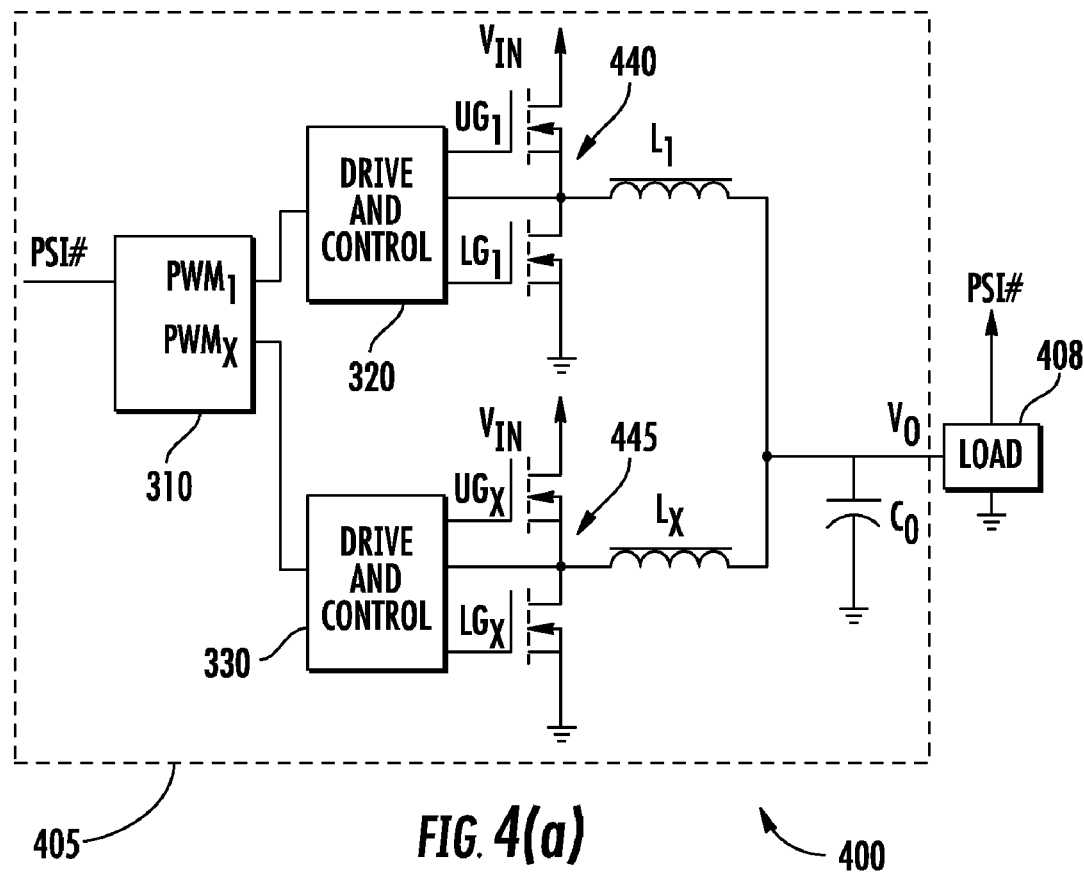
FIG. 4(a) is a block diagram of a system including an exemplary two-phase non-coupled inductor regulator, according to an embodiment of the invention.
Figure 4B:
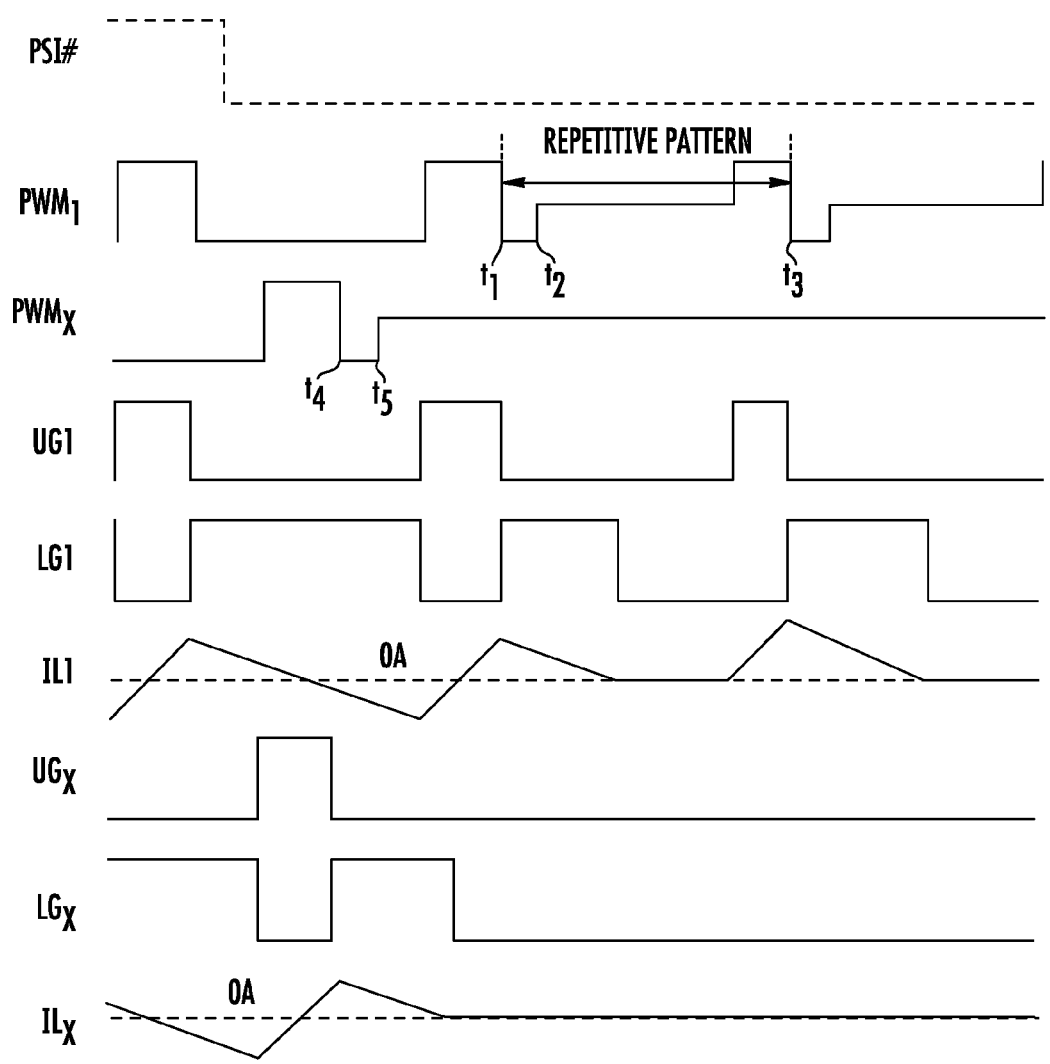
FIG. 4(b) provides waveforms including an exemplary PWM mode signal generated by the controller shown in FIG. 4(a) along with resulting inductor currents for the respective phases.

In one embodiment, when the controller 310 receives a mode indicating signal, such as a low PSI# signal from a microprocessor, or a current sense signal (e.g., via a RDSon sensing circuit) indicating low power regulator operation, controller 310 generates the PWM mode signal according to embodiments of the invention. Exemplary PWM mode signals are shown in FIGS. 4(*b*) and 5(*b*) which evidence three (3) different exemplary states, specifically, ground, VCC/2 and VCC. The PWM mode signal is a pattern that is recognized by the gate drivers 320 and 330 and allows drivers 320 and 330 to realize that the microprocessor (or other load) is operating at a low power mode and to enter DEM and/or implement diode braking or phase dropping. Thus, one embodiment of the invention includes generation of a PWM mode signal, and recognition of the PWM mode signal to trigger low power regulator operational modes including one or more of DEM, diode braking and phase dropping.

FIG. 4(*a*) is a block diagram of a system 400 including an exemplary multi-phase non-coupled inductor regulator 405 according to an embodiment of the invention. System 400 comprises multi-phase modulation controller 310, drivers 320 and 330, and synchronous switches 440 and 445 which each drive an inductor, L1 and Lx, respectively. The inductors are both coupled to load 408. In one exemplary embodiment, load 408 is a microprocessor and provides a PSI# signal which is coupled to an input of controller 310. Alternatively, instead of using a PSI# or equivalent mode indicating signal, for example, the signal sensed by the controller can be via DCR or Rdson sensing.

FIG. 4(*b*) provides waveforms including an exemplary PWM mode signal generated by controller 310 for phase 1 and phase x. Gate driver 320 and 330 output waveforms (UG and LG) and the inductor currents (IL) are also shown for each phase shown. Responsive to the PSI# signal shown going low, at time $t_1$ PWM1 begins a repetitive PWM mode signal pattern shown comprising a negative going pulse to the low level, holding at the low level for a short time (such as 200 ns), and then at $t_2$ rising to an intermediate level, and at $t_3$ rising to the high level.

As seen from IL1, the PWM mode signal PWM1 provided to driver 320 results in LG1 staying low which implements DEM as evidenced by the zero L1 inductor current (0 A) period within the time interval $t_2$ to $t_3$. Phase x is shown implementing phase dropping during the PSI# low period at time $t_4$. At time $t_4$, a negative going PWMx pulse is shown reaching the low level, holding at the low level for a short time (such as 200 ns), and then at $t_5$ rising to the intermediate level. Soon after reaching the intermediate level, phase UGx and LGx (after a brief high period) remain low to implement phase dropping of phase x as evidenced by ILx=0 A shortly after $t_5$.

The phase dropping shown starts at $t_4$, and in one embodiment phase dropping begins when the highest phase goes to PWM=1 for the last time, then enters DEM, while the remained phase PHASE 1, enters the repetitive pattern. For instance, in a 4-phase fixed frequency case, the sequence can start from PWM 4, while PWM 1 will enter DEM at a later time.

The repetition rate of the repetitive pattern depends upon the controller implementation and $V_{COMP}$ signal (i.e. load). It can be a variable or a fixed frequency control. In the case of a light load case (e.g., 0 to 0.1 A), in one embodiment the pulse can be skipped for fixed a frequency control (e.g., mid-level can be very long, operating in burst mode).

Figure 2:
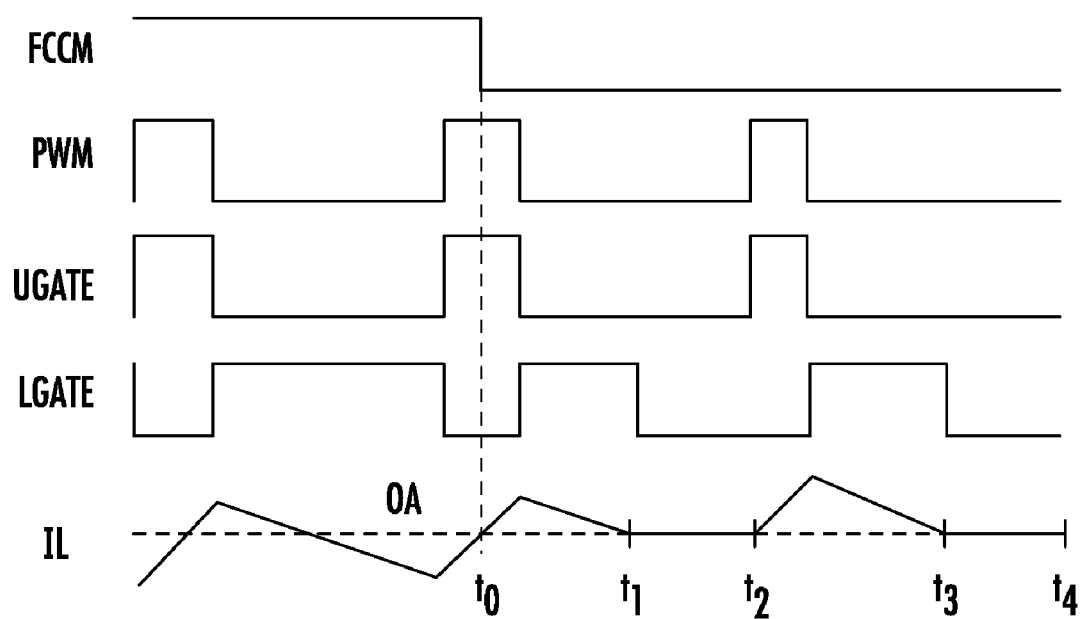
FIG. 2 is a simulated conventional diode communication timing diagram.

Compared to the conventional PWM signal shown in FIG. 2 which uses a conventional PWM signal that provides only a single high level and single low level that is at the single low voltage level (e.g., ground) for the entire low period, the exemplary PWM mode signal according to the invention provides a three (3) state pattern including an intermediate level. As noted above, the PWM mode signal allows saving the controller and driver pins required by conventional controllers and drivers. System performance using controller to driver communications according to the invention as is generally essentially unchanged as compared to a regulator system using conventional controller to driver communications.

Figure 5A:
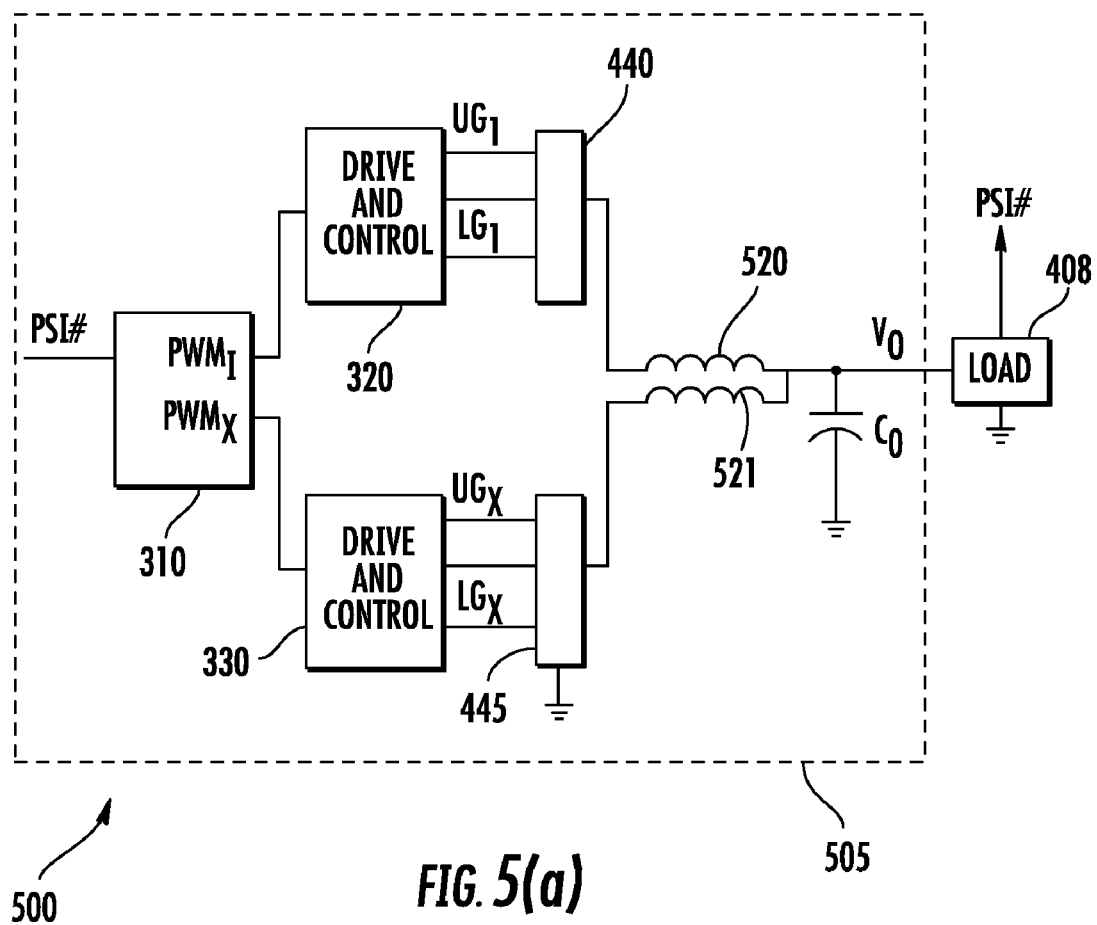
FIG. 5(a) is a block diagram of a system including an exemplary two-phase coupled inductor (CI) regulator, according to an embodiment of the invention.
Figure 5B:
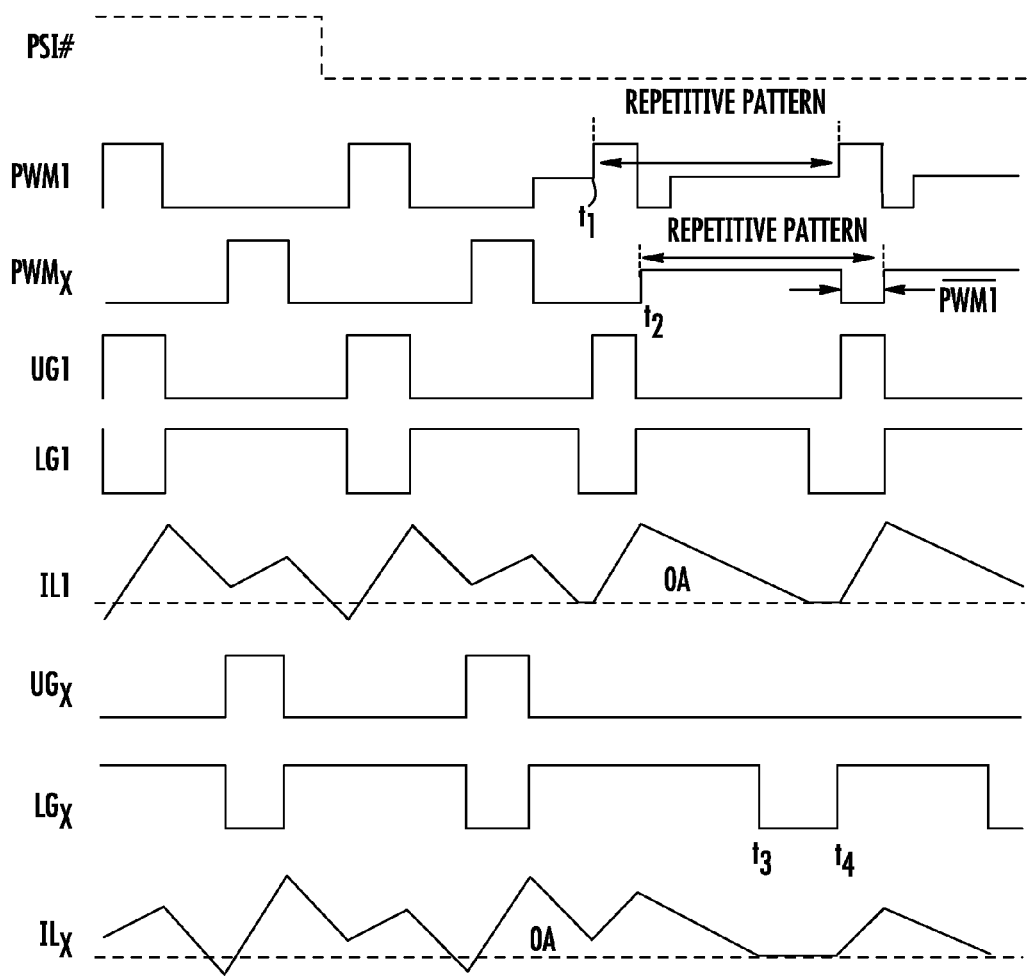
FIG. 5(b) provides exemplary signals including PWM mode signals generated by the controller shown in FIG. 5(a) along with resulting inductor currents for the respective phases.

FIG. 5(*a*) is a block diagram schematic of a system 500 including an exemplary two-phase coupled inductor (CI) regulator 505 comprising controller 310, drivers 320 and 330, synchronous switches 440 and 445, according to an embodiment of the invention. Synchronous switches 440 and 445 drive inductors 520 and 521, respectively, which are both coupled to microprocessor load 408.

FIG. 5(*b*) provides exemplary signals for regulator 505 including an exemplary PWM mode signal generated by controller 310 for phase 1 and phase x. Gate driver 320 and 330 output waveforms (UG and LG) and the inductor currents (IL) are also shown for each phase.

While PSI# is low, at time $t_1$, the repetitive PWM mode signal pattern begins for phase 1. Phase 1 is shown implementing DEM mode. The repetitive pattern for phase x is seen beginning at $t_2$. Soon after $t_2$ phase x is dropped. However, ILx is not always at 0 A after being dropped. Specifically, since the respective phases (phase and phase x) are coupled, in the case of DMOS output switches, the dropped phase (phase x) should have its low-side FET turned on to circulate the coupled current to avoid high body-diode conduction losses. This can be accomplished by the gate driver 330 sending the LGx signal shown in FIG. 5(*b*) to switches 445 to turn on the low side DMOS switch (LGATE) whenever the remained phase (phase 1) has its associated high side DMOS switch turned on.

Figure 6:
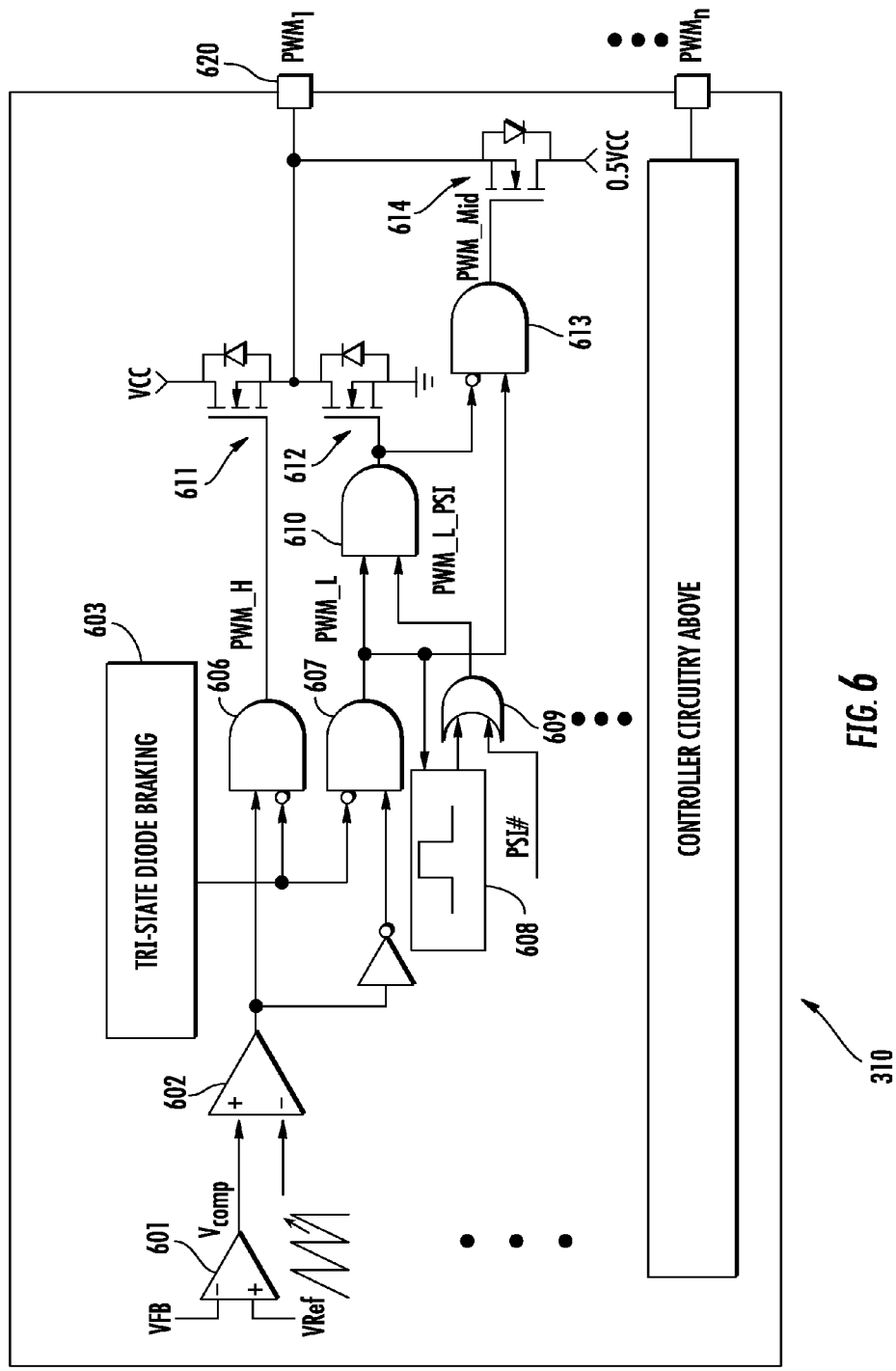
FIG. 6 is a simplified schematic for a multiphase PWM controller according to an embodiment the invention.

FIG. 6 is a schematic for PWM controller 310 which is operable to provide PWM mode signal generation according to an embodiment the present invention. Controller 310 includes error amplifier 601 which provides an output $V_{Comp}$. Comparator 602 is shown receiving Vcomp at its +input and a ramp oscillator signal at its negative input. Controller 301 includes tri-state/diode braking circuit 603 which provides a diode break triggering signal, such as when PWM_H and PWM_L (PWM_H and PWM_L are outputs from AND gates 606 and 607 described below) are at the low level and the circuit sees a high to mid-level transition (e.g., 5V to 2.5V transition). In the diode braking mode, both high-side and low-side FETs turn off. With the low-side FET off, the positive current goes through the body-diode, which results in a high voltage ($V_{OUT}$+Vdiode) across the output inductor, yielding a higher inductor current falling rate and lowering the output voltage overshoot in the load release transient.

Controller 310 includes a pulse timing circuit comprising AND gate 606, AND gate 607, OR gate 609, AND gate 610 and AND gate 613. An output of the pulse timing circuit is operable to provide a PWM mode signal having at least three (3) different levels including at least one intermediate level.

The output from comparator 602 is shown coupled to one input of AND gate 606 and is inverted and coupled to an input of AND gate 607. The output from diode braking circuit 603 is shown coupled to an input of both AND gates 606 and 607 (shown after inversion).

The PWM_H output of AND gate 606 is coupled to the gate of DMOS switch 611. When PWM_H is high, the PWM output 620 of controller 301 goes high. Controller 310 also includes pulse edge generator circuit 608. The output of AND gate 607 (PWM_L) is coupled to an input of pulse edge generator circuit 608, which determines how long the PWM=Low during PSI# mode for both the non-coupled and coupled inductor cases. The output of pulse edge generator circuit 608 and PSI# (or other signal indicative of low power operation) is coupled to OR gate 609. The output of OR gate 609, PWM_L_PSI, and PWM_L (the output of AND gate 607) are coupled to respective inputs of AND gate 610. The output of AND gate 610 is coupled to the gate of DMOS switch 612 and is inverted and coupled to an input of AND gate 613. The output of AND gate 607 is coupled to the other input of AND gate 613. The output of AND gate 613 shown as PWM_Mid is coupled to the gate of DMOS switch 614. The drain of DMOS switch 614 is coupled to the PWM output 620 of controller 310. The source of DMOS switch 614 is coupled to a mid voltage level source, shown as 0.5 VCC (VCC/2). In operation of controller 310, PWM is driven low whenever PWM_L is high and PSI# is high; PWM is low whenever PWM_L_PSI is high and then driven to a mid level whenever PWM_L_PSI is low (e.g., pulse generated by pulse edge generator circuit 608 only passes through to generate a DEM pattern whenever PSI# is low).

In the case of a coupled inductor, the edge pulser circuit 608 can be triggered by the falling edge of the PWM signal for the other phase. Thus, in the coupled phase case, while in DEM (e.g., PSI#=low), the respective PWM signals shown (PWM1 and PWMx) can stay low until the falling edge of the other PWM signal, and then enter into a middle level (e.g., ½ VCC) for the rest of the "low" period. This situation is described relative to FIG. 8 which shows exemplary waveforms for the coupled inductor case as described below.

Controller 310 is indicated as being a multi-phase controller, providing outputs $PWM_1 \ldots PWM_n$. The circuitry shown in FIG. 6 can be replicated for each of the n-phases. Circuitry is generally added to keep the respective phases from generally turning on at the same time (thus being out-of-phase with one another).

Figure 7:
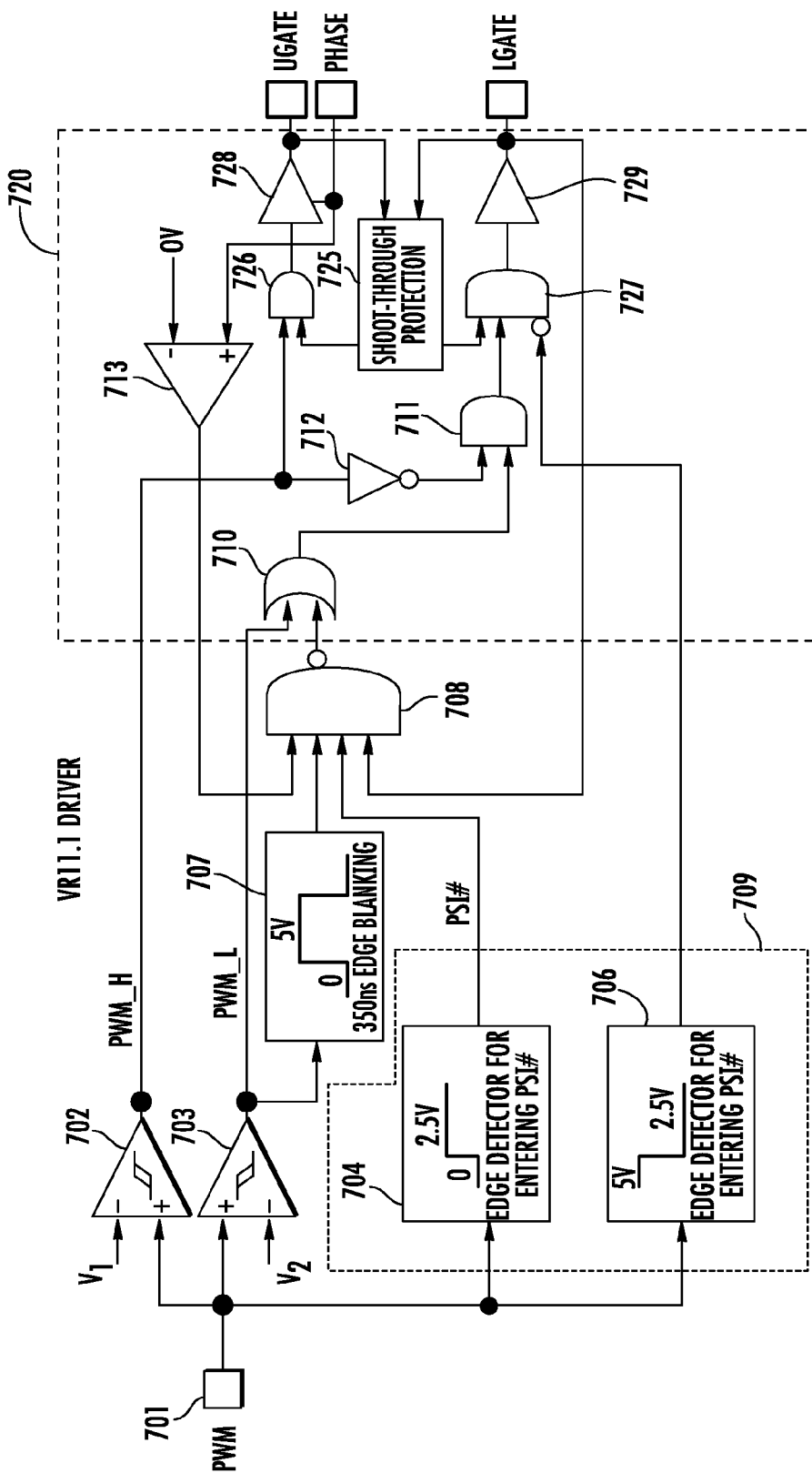
FIG. 7 is a simplified schematic for an exemplary driver operable to detect a PWM mode signal according to an embodiment of the invention.

FIG. 7 is a simplified schematic for an exemplary driver 320 which is operable to interface with PWM controller 310, and provide diode emulation as well as diode braking, according to an embodiment of the present invention. An input of driver 701 is coupled to receive a PWM output provided by a controller according to the invention, such as the PWM output 620 provided by controller 310 shown in FIG. 6. PWM mode signal 701 is coupled to inputs of comparators 702 and 703, as well as to inputs to detection circuitry 709. Comparators 702 and 703 are shown as hysteresis providing comparators, which as known in the art, can reduce noise as compared to conventional comparators.

Detection circuitry 709 is operable for detecting certain edge transitions and to provide signals to other circuitry, including NAND gate 708 and AND gate 727 of output stage 720. Detection circuitry 709 comprises an edge detector 704 operable to detect the load entering a low power mode, and an edge detector 706 operable to implement a diode braking operational mode for the regulator. The inverting input of comparators 702 and the non-inverting input of comparator 703 are shown biased by constant voltage sources, $V_1$ and $V_2$, respectively, for example, $V_1$=3V and $V_2$=2V. The output of comparator 703 is coupled to edge blanking circuit 707.

The output of edge blanking circuit 707, edge detector 704 and feedback signals from output stage 720 are coupled to inputs of AND gate 708. Driver 320 includes output stage 720 which is operable to provide shoot-through protection, diode emulation, diode braking, and optional power-on reset and tri-state during power up/down. Output stage 720 is shown comprising OR gate 710, an output of OR gate 710 coupled one input of AND gate 711, with the other input of AND gate 711 being the PWM_H signal from comparator 702 after inversion by inverter 712. Output stage 720 also includes shoot through protection circuitry 725, gates 726 and 727, and amplifiers 728 and 729. Output stage 720 receives at its inputs outputs from comparator 702 (PWM_H), comparator 703 (PWM_L), the output from NAND gate 708, the output from edge detector 706, as well a signal fed back from the PHASE node of the output switches being driven through comparator 713. Circuit block 720 provides UGATE and LGATE outputs for coupling to the upper and low gates of a synchronous output switch (such as switch 440 shown in FIG. 4(a)).

Regarding the operation of the driver 320 shown in FIG. 7, for DEM operation whenever the driver 320 driver sees a low to mid-level (e.g., 0 to 2.5V) transition, LGATE will turn off but not until after LGATE turns on for a period of time referred to as a blanking time (e.g., 350 ns) and the phase voltage is across "0V" (e.g., 0 A going through the low-side FET). This 350 ns blanking time is longer than PWM=LOW time generated by the controller (e.g., 200 ns) to ensure that the phase node noise settles before detecting a zero current across low-side FET (driven by LGATE). For diode braking (DB) operation, whenever the driver 320 sees a 5V to 2.5V transition, PWM_H=Low, turning off UGATE, at the same time, LGATE turns off as well. Other than DE and DB operations, the driver 320 will generally operate the same manner and have same shoot-through protection scheme as a standard driver implementation. Combining outputs from edge blanking circuit 707 and edge detector 704 and feedback from output stage 720, NAND gate 708 of driver 320 effectively generates an internal PSI# signal, thus eliminating the need of dedicated FCCM signal.

Figure 8:
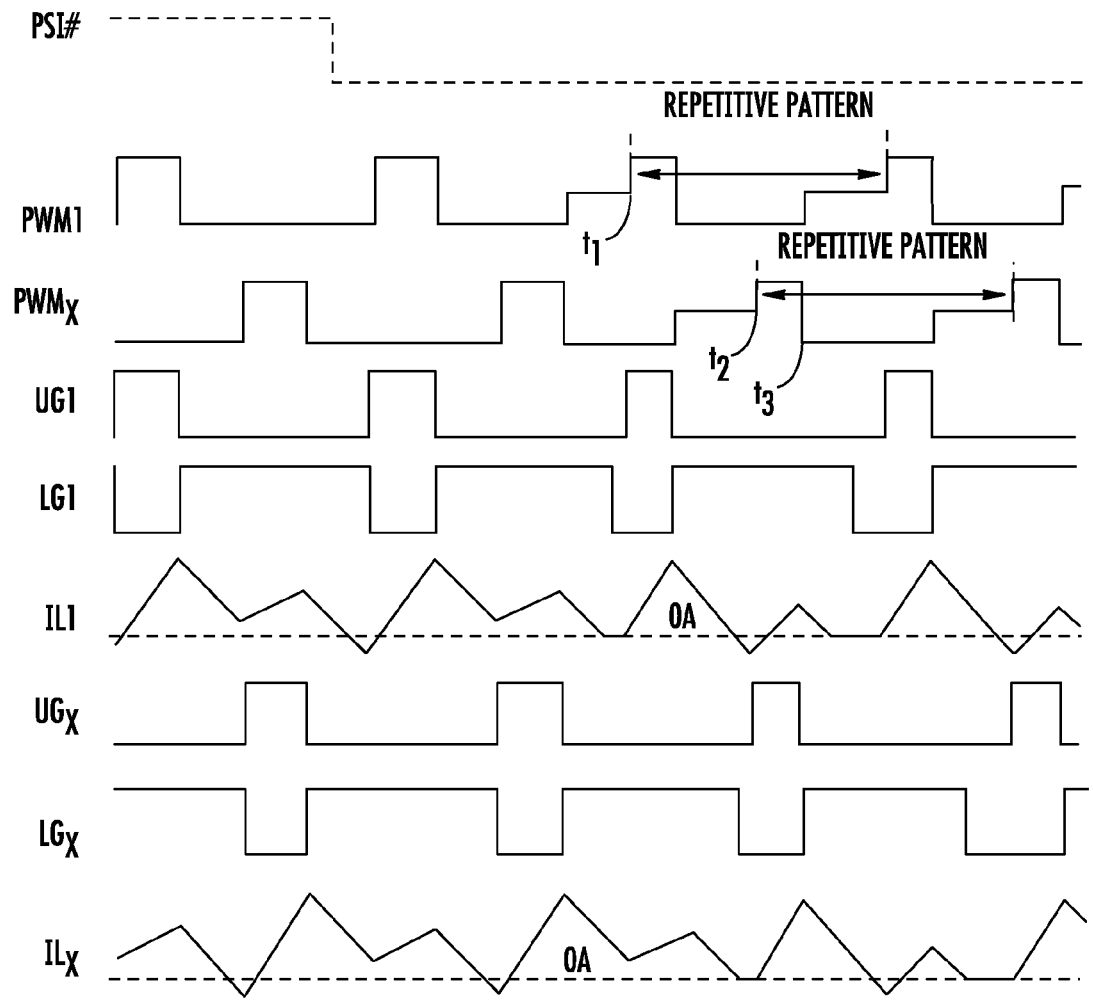
FIG. 8 is a timing diagram showing signals including an exemplary PWM mode signal for a two (2) phase-coupled inductor case with both phases remaining on in DEM, according to an embodiment of the invention.

FIG. 8 shows exemplary PWM mode signals and the signal at other nodes for phase 1 and phase x for a multi-phase coupled inductor regulator system (such as system 500 shown in FIG. 5), without phase dropping implemented. While in DEM (PSI#=low), at time $t_1$ PWM1 begins the PWM mode signal pattern, while PWMx begins the repetitive signal pattern at time $t_2$. The respective PWM mode signals (PWM1 and PWMx) are shown staying low until the falling edge of the other PWM mode signal, and then enter into a middle level (e.g., ½ VCC) for the rest of the "low" period. For example, at time $t_3$, the falling edge of PWMx is seen to coincide with PWM1 reaching the middle level. This arrangement for DMOS switches ensures that the respective coupled phase lower (LGATE) DMOS switches switch only once even though the coupled inductor current could possibly pass zero amps (0 A) twice at very light load.

Figure 9:
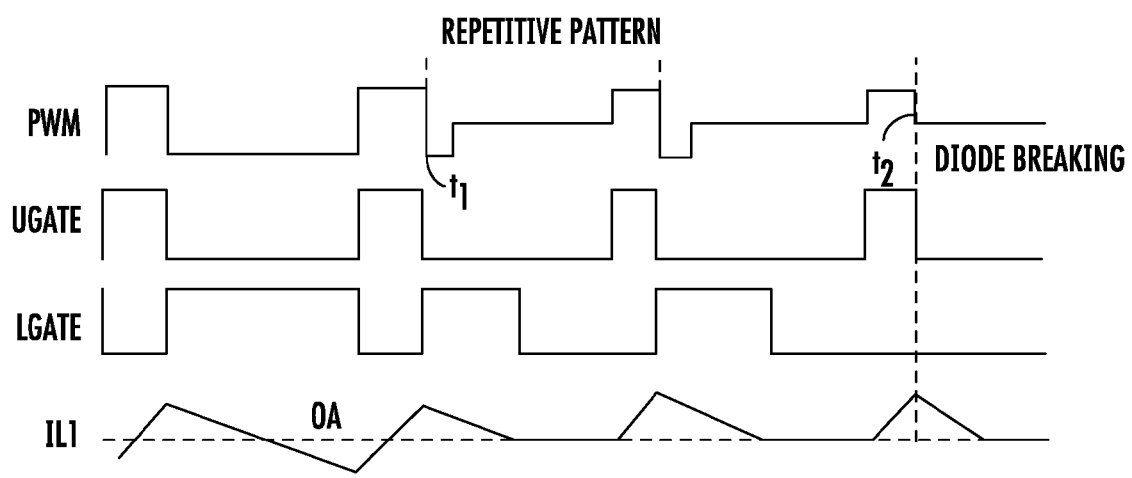
FIG. 9 is a timing diagram showing signals including an exemplary PWM mode signal shown implementing diode braking, according to an embodiment of the invention.

In FIG. 9 an exemplary PWM mode signal and the signal at other nodes is shown for a single phase regulator system implementing diode braking/phase dropping. PSI# (or a low current mode indicating signal) is assumed to be low for the interval shown. At time $t_1$, the repetitive PWM pattern begins. In the arrangement shown, the transitioning of the PWM mode signal from high to the intermediate level (e.g., ½ VCC) is reserved and triggers the diode braking operation as shown at time $t_2$. For one exemplary implementation, see, for example, edge detector 706 shown in FIG. 7. In the diode braking mode, both the high-side and low-side FET switches turn off. In the case of DMOS switches, with the low-side switching FET off, positive current goes through the body-diode of the LFET, resulting in a high voltage (VOUT+ Vdiode) across the output inductor, yielding a higher inductor current falling rate and lowering the output voltage overshoot in the load release transient.

Again in the case of DMOS switches, the application of nPhase-coupled dropping to single or 2 (or more) phase operation generally requires all dropped phases to switch their LGATEx (or LGx) to turn on the lower gate to circulate the current and avoid body-diode conduction. As a result, this can add n-1 or n-2 LGATE switching losses and thus reduce some of the advantage of improved light load efficiency provided by the present invention. One solution is for the n-1 or n-2 phase coupled arrangement is to be operated so that the remained (non-dropped) 1 phase or 2 un-coupled or coupled phases use a PWM mode signal, such as the PWM mode signal patterns shown in FIGS. 4(a), 4(b) and 8, to achieve diode emulation, while other dropped phases (n-1 or n-2) in the case of a coupled core do not carry current and are not required to turn on their LGATEx in contrast to the nPhase-coupled case described above.

For both coupled and non-coupled cases, to realize low body-diode conduction stress on both upper and lower DMOS FETs, the dropped phases can be allowed to be high for the last time before being turned OFF. This makes sure that the corresponding inductors are carrying positive (sourcing) current before entering DEM for a zero current turn off of LGATEx. This can minimize stress to integrated FETs or discrete FETs. In the case phase #1 is the remained phase, in one embodiment the phase dropping sequencing is to start from phase #4. Thus, for a 4-phase system, a firing order of 4-1-2-3 can be used to achieve a smoother transition.

Regarding the controller generation of the PWM mode signal pattern, the slew rate of the PWM mode signal from 0 volts to the intermediate voltage value (e.g., ½ VCC), or VCC to ½ VCC, should generally be limited because a voltage overshoot/spike can be a dv/dt event sufficient to cause false triggering. The slew rate should also generally not be too slow to impair dynamic performance. A slew rate of +/− about ½ VCC/50 ns is generally a suitable value. Regarding detection of the PWM mode signal by the gate driver, the driver can detect the lower power mode once seeing the PWM mode signal at the intermediate level (e.g., ½ VCC) for more than a predetermined period of time (e.g., 50 ns), which can be configured as a timeout to avoid falsely entering DEM mode during normal PWM transitions (e.g., 0 to VCC, VCC to 0). To avoid falsely triggering LGATE OFF too early, the driver can also provide a minimum LGATE on-time, such as 350 ns, to ensure that the phase current is clear before activating the zero amps (0 A) current sensing circuitries. In addition, the gate driver can use the same PWM mode signal to activate the gate drive voltage drop.

In another embodiment of the invention, when the low power mode signal (e.g., PSI=0) or a low power condition is otherwise detected, an integrated internal linear regulator that biases the gate drive can be used to change from full rail (e.g., about 12V) to a lower rail (e.g., about 5V). This embodiment reduces driver switching losses, since the gate drive power losses are proportional to the squared gate drive voltage.

Finally, to smooth transitions entering and exiting DEM, certain variations may be used. For example, as known in the art, phase dropping/adding sequencing, re-adjusting the current balance loop, and special modulation of compensation output voltage may be used with various embodiments of the invention to smooth transitions in and out of DEM.

As described above, one embodiment of the invention provides modulation controllers including multi-phase controllers, and improved drivers. As noted above, controllers according to the invention and gate drivers according to the invention can be combined on the same integrated circuit to provide integrated an controller/gate driver.

Moreover, as described above, the present invention can be used to provide improved switching regulators, including both coupled or non-coupled multi-phase regulators comprising modulation controllers and gate drivers according to the present invention. The improved regulators can be used in systems such as servers, desktop computers, graphics cards, notebook computers, telecom switches and routers, which all generally include microprocessors, which would generally be the load driven by regulator systems based on the invention.

Figure 10:
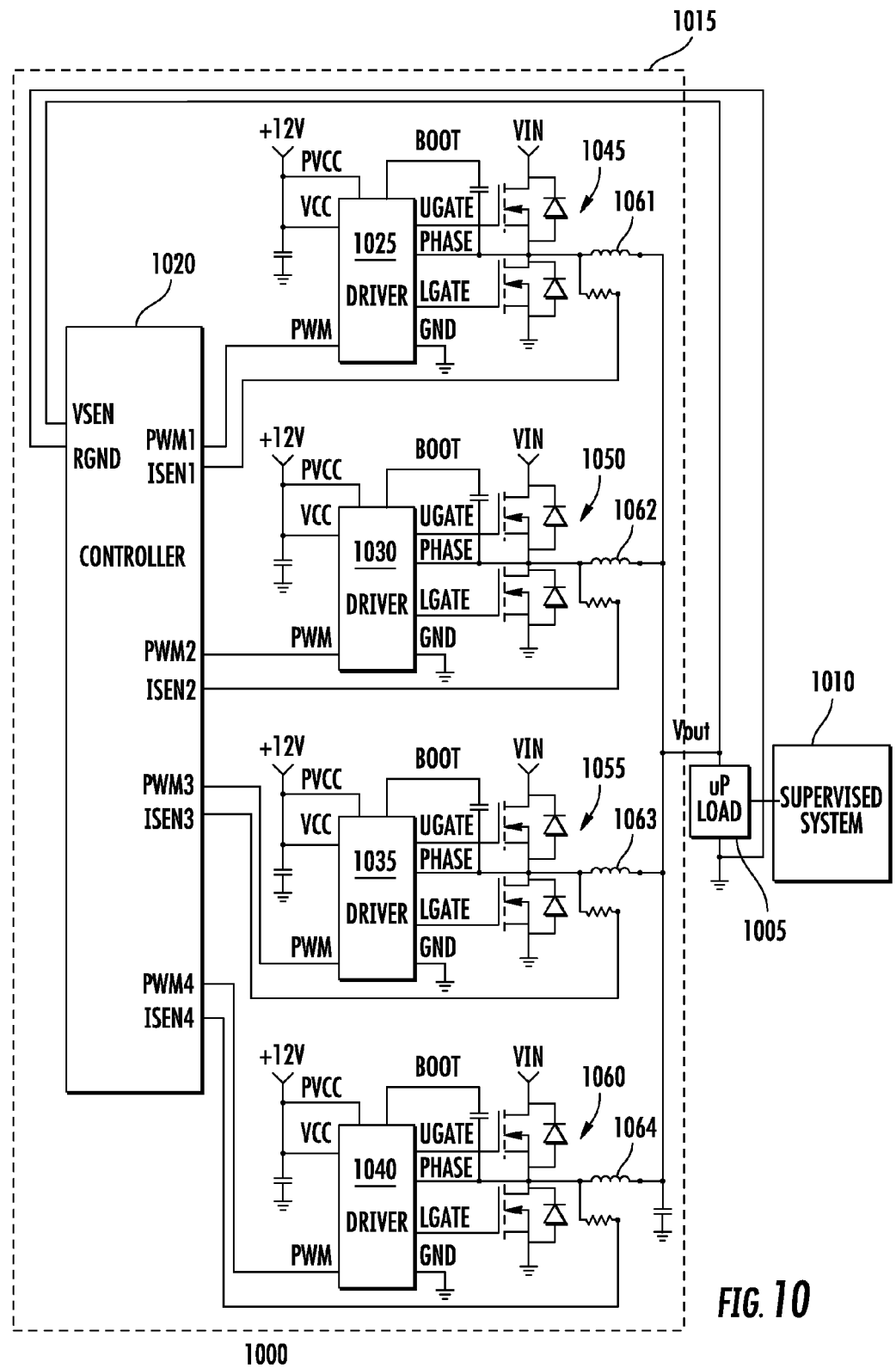
FIG. 10 is a block diagram of a system comprising a multiphase non-coupled regulator, according to an embodiment of the present invention.

FIG. 10 is a block diagram of a system 1000 that includes a 4-phase non-coupled regulator 1015 according to an embodiment of the present invention which drives one or more microprocessor loads 1005. A simplified current sensing arrangement is shown for each of the phases. If microprocessor 1005 provides a PSI# signal, the current sensing arrangement shown would not be required for triggering the communications between the controller and drivers to implement the regulator entering a low power operational mode. However, as known in the art, since the microprocessor only provides the low power indication (e.g., PSI#) signal when the system is in a low power mode, the current sensing signal would still generally be required for current balance between the respective phases. Microprocessor load 1005 typically provides processing and supervisory functions for supervised system 1010, which can comprise, for example, as noted above, a computer system, a graphics system, a switch, a router, an embedded system, or a handheld device.

Regulator 1015 is shown comprising multi-phase (4-phase) controller 1020 according to an embodiment of the invention, and drivers 1025, 1030, 1035 and 1040. The drivers drive synchronous switches 1040, 1045, 1050 and 1055, which are coupled to inductors 1061-1064 respectively, which drive microprocessor load 1005.

In typical operation of system 1000, in one embodiment controller 1020 receives a mode indication signal from load 1005, wherein the mode indicating signal is operable to indicate intervals of time when the load is a low power mode. Controller 1020 determines when the load is in the low power mode based on the mode indicating signal. Responsive to the determining, the controller 1020 generates a PWM mode signals PWM1-PWM4 which each comprise at least three (3) different levels including at least one intermediate level. The PWM mode signals are coupled to inputs of drivers 1025, 1030, 1035 and 1040, respectively. Based on said PWM mode signal, the drivers 1025, 1030, 1035 and 1040 are operable to switch the regulator 1015 into at least one low power operational mode.

Figure 11:
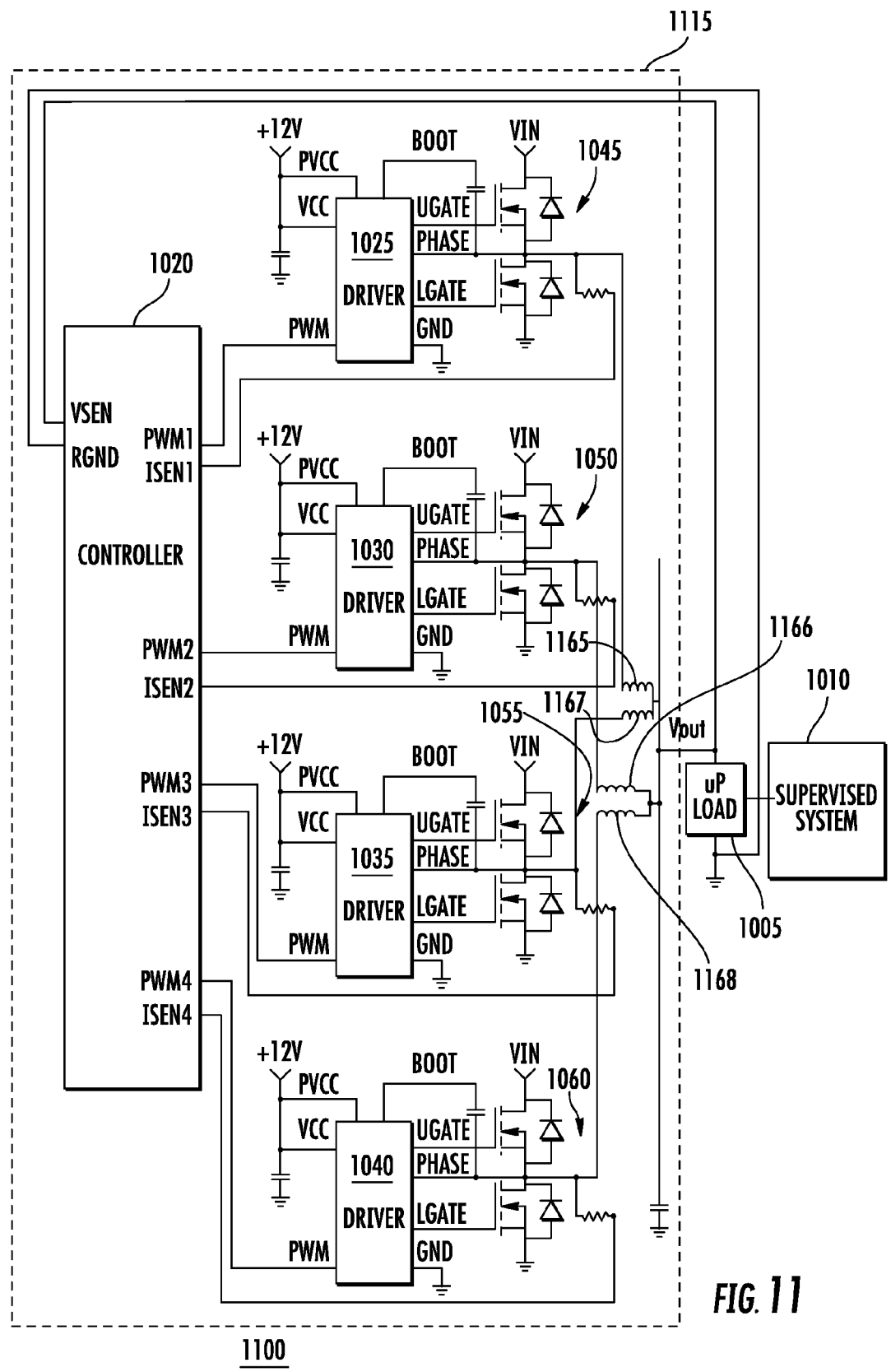
FIG. 11 is a block diagram of a system comprising a multiphase coupled inductor regulator, according to another embodiment of the present invention.

FIG. 11 is a schematic block diagram of a system 1100 that includes a 4-phase coupled inductor regulator 1115 according to an embodiment of the present invention which drives one or more microprocessor loads 1005. Phases 1 and 3 are coupled to one another, and phases 2 and 4 are coupled to one another. Thus, in the arrangement shown, the inductors of phases #1 and 3, shown as reference 1165 and 1167, are coupled, while inductors of phases #2 and 4, shown as reference 1166 and 1168, are also coupled. As with regulator 1015 shown in FIG. 10, regulator 1115 is shown comprising a multi-phase (4-phase) controller 1020 according to an embodiment of the invention, and drivers 1025 (phase #1),

1030 (phase #2), 1035 (phase #3) and 1040 (phase #4). These drivers drive synchronous switches 1040, 1045, 1050 and 1055, respectively.

System 1100 generally operates in analogously to system 1000 described above. However, in system 1100 the inductors of phase 1 and 3 are coupled, as are the inductors of phase 2 and 4. In the case of lower power mode (e.g., PSI#=0) with DMOS output switches, the coupled phase must to turn on LGATE to circulate coupled current to avoid body diode conduction while the other phase turns on.

In the preceding description, certain details are set forth in conjunction with the described embodiment of the present invention to provide a sufficient understanding of the invention. One skilled in the art will appreciate, however, that the invention may be practiced without these particular details. Furthermore, one skilled in the art will appreciate that the example embodiments described above do not limit the scope of the present invention and will also understand that various modifications, equivalents, and combinations of the disclosed embodiments and components of such embodiments are within the scope of the present invention.

Moreover, embodiments including fewer than all the components of any of the respective described embodiments may also within the scope of the present invention although not expressly described in detail. Finally, the operation of well known components and/or processes has not been shown or described in detail below to avoid unnecessarily obscuring the present invention.

One skilled in the art will understand that even though various embodiments and advantages of the present invention have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate may be realized through software executing on suitable processing circuitry. The present invention is to be limited only by the appended claims.

What is claimed is:

1. A driver for driving output switches coupled to a load in a switching regulator-based system, comprising:
   an input stage comprising a pair of comparators operable to receive a pulse width modulation (PWM) mode signal having at least three (3) different levels including at least one intermediate level, and at least one detection circuit operable to detect said PWM mode signal; and
   an output stage coupled to receive outputs from said input stage and said detection circuit, said output stage operable for recognizing when said PWM mode signal is at or transitioning to or from said intermediate level to another level, and responsive thereto, providing a plurality of output signals to said output switches operable to switch a regulator into at least one low power operational mode.

2. The driver of claim 1, wherein said driver is operable to detect at least one edge of said PWM mode signal.

3. The driver of claim 1, wherein said at least one detection circuit comprises a first edge detector operable to detect said load entering a low power mode, a second edge detector operable for detecting said load exiting said low power mode, and another edge detector operable to implement a diode braking operational mode for said regulator.

* * * * *